(12) United States Patent
Zhang et al.

(10) Patent No.: US 12,545,078 B2
(45) Date of Patent: Feb. 10, 2026

(54) ENGINEERING VEHICLE AND AIR CONDITIONING SYSTEM THEREOF

(71) Applicant: JIANGSU XCMG CONSTRUCTION MACHINERY RESEARCH INSTITUTE LTD., Jiangsu (CN)

(72) Inventors: Zhanwen Zhang, Jiangsu (CN); Yanbo Geng, Jiangsu (CN)

(73) Assignee: JIANGSU XCMG CONSTRUCTION MACHINERY RESEARCH INSTITUTE LTD., Jiangsu (CN)

( * ) Notice: Subject to any disclaimer, the term of this patent is extended or adjusted under 35 U.S.C. 154(b) by 567 days.

(21) Appl. No.: 17/916,950

(22) PCT Filed: Nov. 9, 2021

(86) PCT No.: PCT/CN2021/129636
§ 371 (c)(1),
(2) Date: Oct. 4, 2022

(87) PCT Pub. No.: WO2022/160858
PCT Pub. Date: Aug. 4, 2022

(65) Prior Publication Data
US 2023/0150338 A1 May 18, 2023

(30) Foreign Application Priority Data
Sep. 30, 2021 (CN) .......................... 202111156890.1

(51) Int. Cl.
*B60H 1/00* (2006.01)
*E02F 9/08* (2006.01)
(Continued)

(52) U.S. Cl.
CPC ..... *B60H 1/00842* (2013.01); *B60H 1/00357* (2013.01); *E02F 9/0858* (2013.01); *B60H 1/3414* (2013.01); *E02F 9/16* (2013.01)

(58) Field of Classification Search
CPC .............. B60H 1/00842; B60H 1/3414; B60H 2001/00092; B60H 2001/3471
(Continued)

(56) References Cited

U.S. PATENT DOCUMENTS

2002/0000314 A1* 1/2002 Danieau ............. B60H 1/00985
165/203

FOREIGN PATENT DOCUMENTS

| CN | 101358779 A | 2/2009 | |
|---|---|---|---|
| CN | 102155300 A * | 8/2011 | ............. F01D 25/30 |

(Continued)

OTHER PUBLICATIONS

International Search Report and Written Opinion mailed Jun. 1, 2022 in International Patent Application PCT/CN2021/129636.
(Continued)

*Primary Examiner* — Allen R. B. Schult
*Assistant Examiner* — William C Weinert
(74) *Attorney, Agent, or Firm* — Venable LLP (57) ABSTRACT

This disclosure provides an engineering vehicle and an air conditioning system thereof beneficial to improve comfortability of drivers. The air conditioning system includes: an air conditioner body, including a shell with first and second air outlets; a first air supply pipeline, a first end of the first air supply pipeline being connected to the first air outlet; first air support port(s), arranged at an inner front end of a cab of the engineering vehicle and connected to a second end of the first air supply pipeline; a second air supply pipeline, a first end of the second air supply pipeline being connected to the second air outlet; second air supply port(s), arranged at an inner rear end of the cab and connected to a second end of the second air supply pipeline; and a flow distribution device including a flow dividing portion located in the shell.

17 Claims, 6 Drawing Sheets

(51) Int. Cl.
*B60H 1/34* (2006.01)
*E02F 9/16* (2006.01)

(58) Field of Classification Search
USPC .......................................................... 454/139
See application file for complete search history.

(56) References Cited

FOREIGN PATENT DOCUMENTS

| | | | | |
|---|---|---|---|---|
| CN | 202727922 U | | 2/2013 | |
| CN | 103269927 A | * | 8/2013 | .............. B60K 6/46 |
| CN | 203876535 U | * | 10/2014 | |
| CN | 203958155 U | * | 11/2014 | |
| CN | 106196544 A | | 12/2016 | |
| CN | 106274379 A | | 1/2017 | |
| CN | 106274942 A | | 1/2017 | |
| CN | 106541801 A | | 3/2017 | |
| CN | 206031382 U | * | 3/2017 | |
| CN | 206781485 U | | 12/2017 | |
| CN | 210062982 U | | 2/2020 | |
| CN | 112440679 A | * | 3/2021 | ............ B60H 1/3414 |
| DE | 102019200381 A1 | * | 7/2020 | ......... B60H 1/00371 |

OTHER PUBLICATIONS

Extended European Search Report issued Mar. 25, 2024 in EP Application No. 21922448.2.

* cited by examiner

ENGINEERING VEHICLE AND AIR CONDITIONING SYSTEM THEREOF

CROSS-REFERENCE TO RELATED APPLICATIONS

The present application is a U.S. national stage entry of International Application No. PCT/CN2021/129636, filed Nov. 9, 2021, titled "ENGINEERING VEHICLE AND AIR-CONDITIONING SYSTEM THEREOF", which is based upon and claims priority to Chinese Patent Application No. 202111156890.1, filed on Sep. 30, 2021, titled "ENGINEERING VEHICLE AND AIR CONDITIONING SYSTEM THEREOF", the entire contents of which are hereby incorporated by reference in their entireties.

FIELD OF THE DISCLOSURE

The present disclosure relates to the technical field of engineering machinery, and in particular, to an engineering vehicle and an air conditioning system thereof.

BACKGROUND OF THE DISCLOSURE

Engineering vehicles are generally applied in the field of building construction. When some engineering vehicles perform different operations, sometimes the driver faces forward and the seat of the cab faces forward at this time, and sometimes the driver faces backward and the seat of the cab faces backward. A plurality of air supply ports for supplying air to the cab in the air conditioning system of the engineering vehicle are arranged at the inner front end and the inner rear end of the cab respectively so as to supply air to the inner front end and the inner rear end of the cab at the same time.

SUMMARY OF THE DISCLOSURE

An objective of the present disclosure is to provide an engineering vehicle and an air conditioning system thereof, thereby improving the comfortability of drivers.

According to a first aspect of the present disclosure, an air conditioning system of an engineering vehicle is provided and is used to adjust the temperature of a cab of the engineering vehicle. The air conditioning system includes:
  an air conditioner body, including a shell, wherein the shell includes a first air outlet and a second air outlet;
  a first air supply pipeline, wherein a first end of the first air supply pipeline is connected to the first air outlet;
  one or more first air supply ports, configured to be arranged at an inner front end of the cab and connected to a second end of the first air supply pipeline;
  a second air supply pipeline, wherein a first end of the second air supply pipeline is connected to the second air outlet;
  one or more second air supply ports, configured to be arranged at an inner rear end of the cab and connected to a second end of the second air supply pipeline; and
  a flow distribution device, including a flow dividing portion arranged in the shell, wherein the flow dividing portion is movably arranged relative to at least one of the first air outlet or the second air outlet so as to change an outlet air volume ratio, and the outlet air volume ratio is a ratio of an air volume flowing out of the shell from the first air outlet to an air volume flowing out of the shell from the second air outlet.

In the air conditioning system of some embodiments, the flow dividing portion includes:
  a first wind shielding surface, arranged between the first air outlet and the second air outlet;
  a second wind shielding surface, arranged between the first wind shielding surface and the second air outlet; and
  a wind guide surface, protruding towards a wind coming side, wherein the wind guide surface is in smooth connection with the first wind shielding surface and the second wind shielding surface respectively.

In the air conditioning system of some embodiments,
  the first wind shielding surface inclines towards the first air outlet from the wind guide surface; and/or
  the second wind shielding surface inclines towards the second air outlet from the wind guide surface.

In the air conditioning system of some embodiments,
  one side of the first wind shielding surface facing towards the first air outlet is a recessed curved surface; and/or
  one side of the second wind shielding surface facing towards the second air outlet is a recessed curved surface.

In the air conditioning system of some embodiments, the first air outlet and the second air outlet are arranged oppositely and are respectively located on two opposite sides of the shell, and the flow dividing portion is movably arranged between the first air outlet and the second air outlet.

In the air conditioning system of some embodiments, the flow distribution device further includes a driving portion, and the driving portion is in driving connection with the flow dividing portion and is configured to change the relative position of the flow dividing portion and at least one of the first air outlet or the second air outlet so as to change the outlet air volume ratio.

In the air conditioning system of some embodiments, the driving portion includes a switching mechanism, the flow dividing portion includes a switching cooperation portion cooperating with the switching mechanism, and the switching mechanism is configured to move the switching cooperation portion to drive the flow dividing portion to move so as to change the relative position of the flow dividing portion and at least one of the first air outlet or the second air outlet.

In the air conditioning system of some embodiments, the switching mechanism includes:
  a rotating shaft, rotatably arranged on the shell; and
  a switching plate, connected to the rotating shaft and cooperating with the switching cooperation portion.

In the air conditioning system of some embodiments, the switching cooperation portion includes an opening or groove formed in the flow dividing portion, and the switching mechanism is inserted into the opening or groove.

In the air conditioning system of some embodiments, the driving portion includes an actuator, and the actuator is in driving connection with the flow dividing portion to drive the flow dividing portion to move so as to change the relative position of the flow dividing portion and at least one of the first air outlet or the second air outlet.

In the air conditioning system of some embodiments, the flow distribution device further includes a limiting structure, and the limiting structure is configured to limit the limit position of movement of the flow dividing portion.

In the air conditioning system of some embodiments, the limiting structure includes:
  a first limiting portion, configured to limit the limit position of the flow dividing portion moving towards the first air outlet; and/or a second limiting portion, configured to limit the limit position of the flow dividing portion moving towards the second air outlet.

In the air conditioning system of some embodiments, the limiting structure includes a first protrusion arranged on an inner wall surface of the shell and arranged between the flow dividing portion and the first air outlet, and/or a second protrusion arranged on an inner wall surface of the shell and arranged between the flow dividing portion and the second air outlet.

In the air conditioning system of some embodiments, the first air supply pipeline or the second air supply pipeline includes an elbow pipe, and the elbow pipe includes:

an elbow pipe body, having an inner flow channel; and
at least one flow guide plate, wherein the flow guide plate is located in the elbow pipe body, and the at least one flow guide plate divides the inner flow channel of the elbow pipe body into a plurality of flow passing areas.

In the air conditioning system of some embodiments, a surface of the flow guide plate includes a plurality of flow guide grooves which extend along an extending direction of the elbow pipe body and are arranged in parallel.

In the air conditioning system of some embodiments, at least one of the first air supply ports or at least one of the second air supply ports includes:

an air supply body, having an air supply channel arranged along an air supply direction; and
one or more barrier strips, wherein the barrier strip is arranged in the air supply channel and forms an included angle with the air supply direction, and a first toothed structure is arranged on a windward side of the barrier strip facing towards the air supply direction and/or a second toothed structure is arranged on a leeward side of the barrier strip back to the air supply direction.

In the air conditioning system of some embodiments,
at least two barrier strips of the plurality of barrier strips are arranged on a plane perpendicular to the air supply direction in parallel and at intervals; and/or
at least two barrier strips of the plurality of barrier strips are crossed on a plane perpendicular to the air supply direction.

According to a second aspect of the present disclosure, an engineering vehicle is provided. The engineering vehicle includes: a cab; and an air conditioning system of the engineering vehicle according to the first aspect of the present disclosure, the one or more first air supply ports of the air conditioning system are arranged at an inner front end of the cab, and the one or more second air supply ports of the air conditioning system are arranged at an inner rear end of the cab.

In the engineering vehicle of some embodiments, the engineering vehicle is a loader-digger.

Based on the engineering vehicle and the air conditioning system thereof provided by the present disclosure, in the working process, if a driver changes direction according to different operation requirements, when the driver changes direction, the relative position of the flow dividing portion and at least one of the first air outlet or the second air outlet may be changed by moving the flow dividing portion of the flow distribution device, so that the outlet air volume ratio of the air conditioner body is changed, the change of the air supply ratio between the inner front end and the inner rear end of the cab is realized, and more air supply amount can be obtained in the direction which the driver faces. The air supplied by the air supply port behind the driver will not directly blow to the driver's body due to the blockage of the seat, and the driver's feeling on the air supply from the air conditioner mainly comes from the air supplied by the air supply port in front of the driver; therefore, the air supply amount of the air supply port in front of the driver is more, and the comfortability of the driver is improved.

Other features and advantages of the present disclosure will become apparent by the detailed description for exemplary embodiments of the present disclosure with reference to the following accompany drawings.

BRIEF DESCRIPTION OF THE ACCOMPANYING DRAWINGS

The accompanying drawings described herein are used to provide further understanding of the present disclosure and constitute a part of the present application. The schematic embodiments of the present disclosure and the description thereof are used to explain the present disclosure, but do not constitute an inappropriate limitation to the present disclosure. In the accompanying drawings.

DETAILED DESCRIPTION OF THE PREFERRED EMBODIMENTS

The technical solutions in the embodiments of the present disclosure are described clearly and completely with reference to the accompanying drawings in the embodiments of the present disclosure. Apparently, the described embodiments are merely a part rather than all of the embodiments of the present disclosure. The following description of the at least one exemplary embodiment is actually merely illustrative and never constitutes any limitation to the present disclosure and application or use thereof. All other embodiments made on the basis of the embodiments of the present disclosure by a person of ordinary skill in the art without paying any creative effort shall be included in the protection scope of the present disclosure.

Unless otherwise specified, relative arrangement, numerical expressions and values of parts and steps described in the embodiments do not limit the scope of the present disclosure. Meanwhile, it should be understood that for the convenience of description, the dimensions of each part shown in the accompanying drawings are not drawn according to the actual proportional relationship. Technologies, methods and devices known to those of ordinary skill in the related field may not be discussed in detail, but, where appropriate, the technologies, methods and devices should be regarded as a part of the authorized specification. In all the examples shown and discussed herein, any specific value should be interpreted as merely exemplary rather than a limitation. Therefore, other examples of the exemplary embodiments may have different values. It should be noted that similar reference numerals and letters represent similar items in the accompanying drawings below. Therefore, once a certain item is defined in one drawing, it is unnecessary to further discuss the item in the subsequent drawings.

In the description of the present disclosure, it should be understood that the words "first", "second" and the like for limiting parts are merely for convenience of distinguishing corresponding parts. Unless otherwise stated, the above words do not have special meanings and cannot be construed as limitations to the protection scope of the present disclosure.

In the description of the present disclosure, it should be understood that an azimuth or position relationship indicated by azimuth words "front, rear, upper, lower, left, right", "transverse, longitudinal, vertical, horizontal, "top, bottom" and the like is generally an azimuth or position relationship based on the accompanying draws, which is only for facilitating description of the present disclosure and simplifying description. In the absence of a statement to the contrary, these azimuth words do not indicate and imply that the referred device or component must have a specific azimuth or perform construction and operation in the specific azimuth; therefore, it cannot be interpreted as a limitation to the protection scope of the present disclosure. The azimuth words "inner, outer" refer to the inside and outside relative to the outline of each component itself.

In the following description, unless otherwise specified, the "front" refers to one side which the engineering vehicle faces when driving, "rear" refers to one side opposite to "front", and "left" and "right" refer to left and right directions formed when the engineering vehicle faces the front.

In the process of finding the present disclosure, the inventors have studied that in related art, in the engineering vehicle which needs to change the orientation of the seat when perform different operations, the driver has good experience on the air conditioning system when the seat of the cab is forward, and the driver has poor experience on the air conditioning system when the seat is backward. The following performs specific description by taking the loader-digger as an example.

The loader-digger has powerful functions and is widely applied in various projects. Operating the loader-digger often requires long-time operation, so the comfortable feeling of the driver is very important. The cab environment with comfortable temperature and appropriate noise is help-ful for the driver to keep a good working condition, improve the working efficiency and reduce the misoperation rate.

In related art, in the air conditioning system of the loader-digger, the ratio of air supply to the front end and the rear end of the cab is fixed, and the air supply volume to the front end of the cab is generally greater than that to the rear end of the cab. In the working process of the loader-digger, the working device is switched between the loading end device and the digging end device, and the driver will change the direction as the position of the working device is switched. When the working device is at the loading end, the driver faces towards the front end. When the working device is at the digging end, the driver faces towards the rear end. When the driver changes the direction as the position of the working device is switched, the difference between the air supply volumes of the air supply ports at the front end and the rear end of the cab makes the driver obviously feel the change of the body comfortability.

In addition, in order to adapt to the mounting space, the air supply pipeline of the air conditioning system often has many elbows in the design process. When the elbow is close to the flow dividing position, large vortex flow is generated at the elbow. On one hand, the flow distribution of the plurality of air supply ports connected to the same air supply pipeline is affected, which may make the flow output by different air supply ports differ greatly; and on the other hand, the large vortex flow at the elbow will form aerodynamic noise, and the aerodynamic noise will be transmitted into the cab with the air supply airflow.

Furthermore, the air supply port in the cab is prone to form a large amount of vortex flow to generate vortex noise when the airflow is supplied to the air supply port from the air supply pipeline, so squealing noise may be generated when the air supply port is adjusted to a specific opening degree.

To solve the above-mentioned technical problems, embodiments of the present disclosure provide an engineering vehicle, including a cab and an air conditioning system.

As shown in FIG. 1 to FIG. 6, the air conditioning system includes an air conditioner body 1, a first air supply pipeline 2, one or more first air supply ports 4, a second air supply pipeline 3, one or more second air supply ports 6 and a flow distribution device 5.

As shown in FIG. 1 to FIG. 4, the air conditioner body 1 includes a shell 11. The shell 11 is provided with a first air outlet 11A and a second air outlet 11B.

Figure 1:
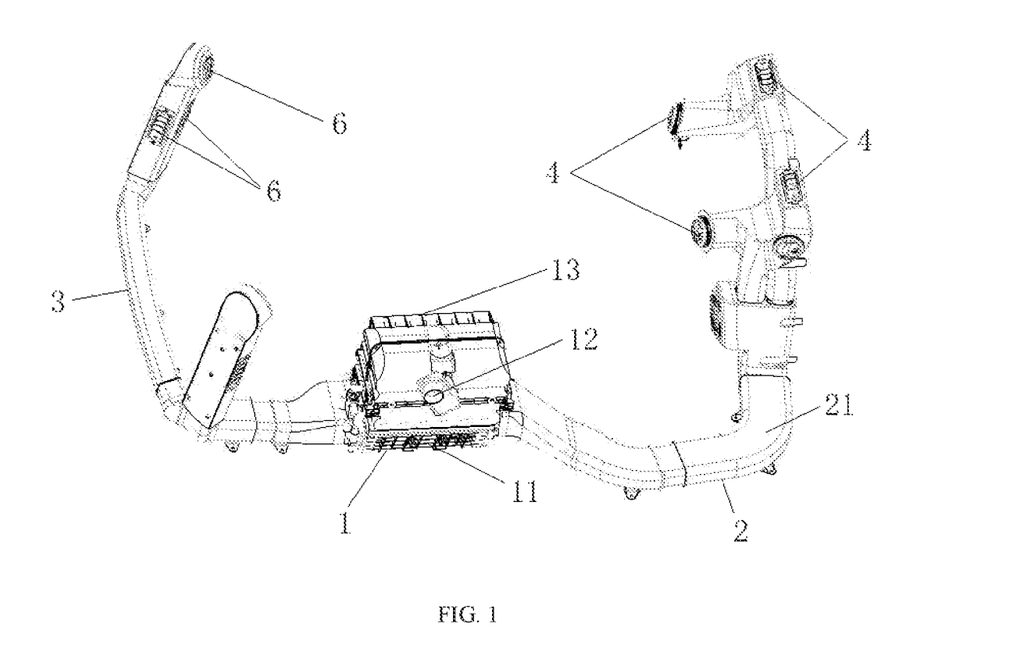
FIG. 1 is a structural schematic diagram of an air conditioning system of an engineering vehicle according to an embodiment of the present disclosure.

As shown in FIG. 1, a first end of the air supply pipeline 2 is connected to the first air outlet 11A. The first air supply port 4 is arranged at an inner front end of the cab, and the first air supply port 4 is connected to a second end of the first air supply pipeline 2. The first end of the second air supply pipeline 3 is connected to the second air outlet 11B. The second air supply port 6 is arranged at an inner rear end of the cab, and the second air supply port 6 is connected to a second end of the second air supply pipeline 3.

As shown in FIG. 2 to FIG. 5, the flow distribution device 5 includes a flow dividing portion 51 arranged in the shell 11. The flow dividing portion 51 is movably arranged relative to at least one of the first air outlet 11A or the second air outlet 11B so as to change an outlet air volume ratio of the air conditioner body 1. The outlet air volume ratio is a ratio of an air volume flowing out of the shell 11 from the first air outlet 11A to an air volume flowing out of the shell 11 from the second air outlet 11B.

According to the air conditioning system provided by the embodiments of the present disclosure, in the working process, if a driver changes direction according to different operation requirements, when the driver changes direction, the relative position of the flow dividing portion 51 and at least one of the first air outlet 11A or the second air outlet 11B may be changed by moving the flow dividing portion 51 of the flow distribution device 5, so that the outlet air volume ratio of the air conditioner body 1 is changed, the change of the air supply ratio between the inner front end and the inner rear end of the cab is realized, and more air supply amount can be obtained in the direction which the driver faces. The air supplied by the air supply port behind the driver will not directly blow to the driver's body due to the blockage of the seat, and the driver's feeling on the air supply from the air conditioner mainly comes from the air supplied by the air supply port facing the driver; therefore, the air supply amount of the air supply port in front of the driver is more, and the comfortability of the driver is improved.

Figure 5:
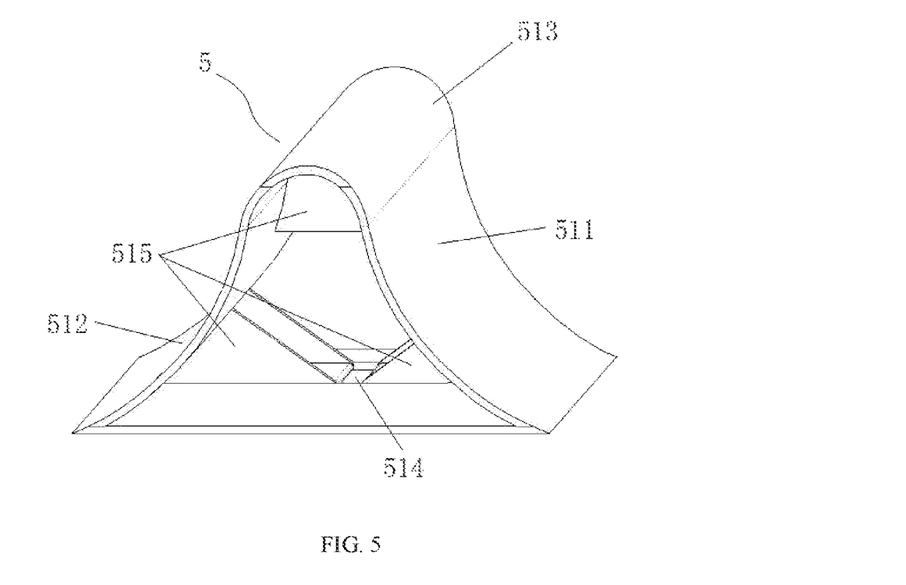
FIG. 5 is a structural schematic diagram of a flow dividing portion of a flow distribution device of an air conditioner body in the air conditioning system shown in FIG. 1.

In the air conditioning system of some embodiments, the flow dividing portion 51 includes a first wind shielding surface 511, a second wind shielding surface 512 and a wind guide surface 513. The first wind shielding surface 511 is arranged between the first air outlet 11A and the second air outlet 11B. The second wind shielding surface 512 is arranged between the first wind shielding surface 511 and the second air outlet 11B. The wind guide surface 513 protrudes towards a wind coming side, and the wind guide surface 513 is in smooth connection with first wind shielding surface 511 and second wind shielding surface 512 respectively. This arrangement is beneficial to the distribution of the air volume between the first air outlet 11A and the second air outlet 11B, and is beneficial to the reduction of resistance and noise caused by the distribution.

In the air conditioning system of some embodiments, the first wind shielding surface 511 inclines towards the first air outlet 11A from the wind guide surface 513; and/or the second wind shielding surface 512 inclines towards the second air outlet 11B from the wind guide surface 513. This arrangement is beneficial for the airflow to flow stably between the first wind shielding surface 511 and the first air outlet 11A and/or between the second wind shielding surface 512 and the second air outlet 11B, and is beneficial to the reduction of resistance and noise caused by the change of the air volume distribution.

In the air conditioning system of some embodiments, one side of the first wind shielding surface 511 facing towards the first air outlet 11A is a recessed curved surface; and/or one side of the second wind shielding surface 512 facing towards the second air outlet 11B is a recessed curved surface. This arrangement is beneficial for the airflow to flow stably between the first wind shielding surface 511 and the first air outlet 11A and/or between the second wind shielding surface 512 and the second air outlet 11B, and is beneficial to the reduction of resistance and noise caused by the change of the air volume distribution.

Figure 2:
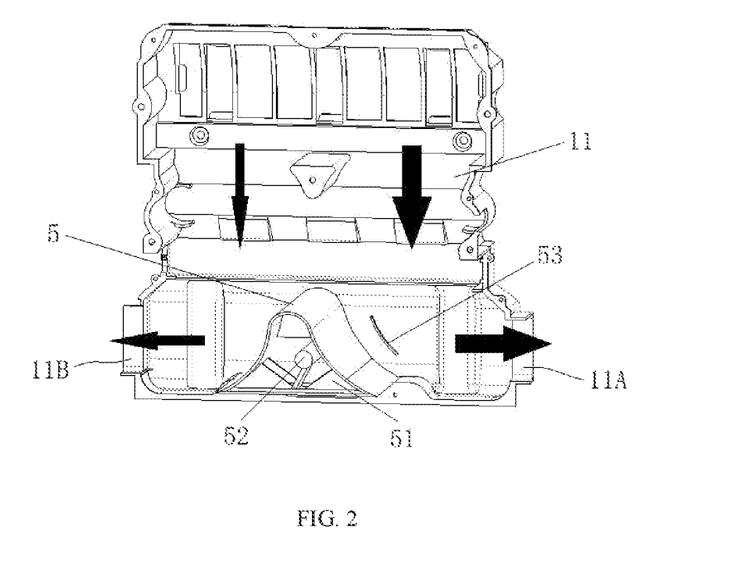
FIG. 2 is a structural schematic diagram of a combined structure of part of a shell of an air conditioner body and a flow distribution device in the air conditioning system shown in FIG. 1 in a working state.
Figure 3:
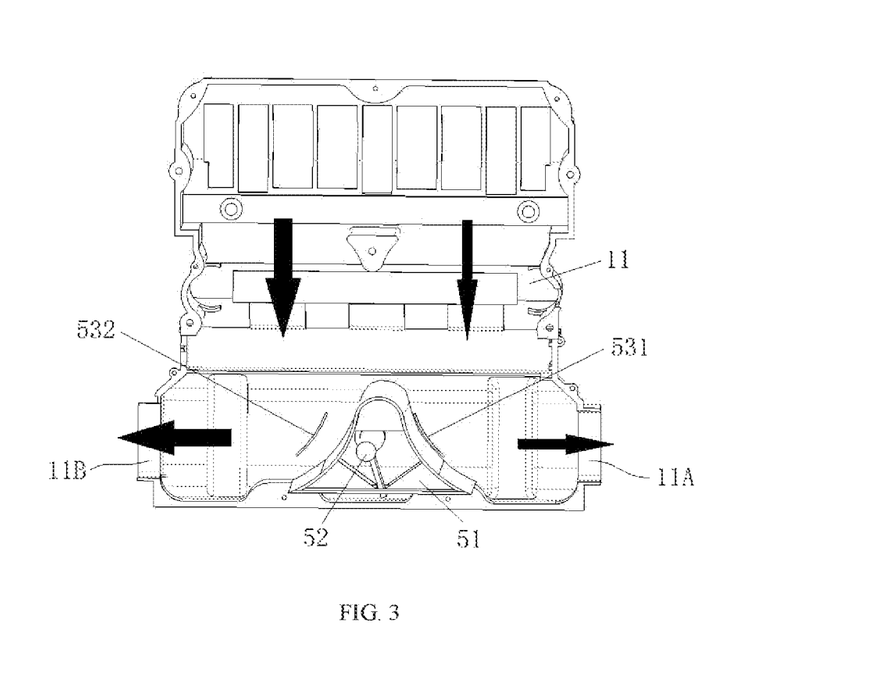
FIG. 3 is a structural schematic diagram of a combined structure of part of a shell of an air conditioner body and a flow distribution device in the air conditioning system shown in FIG. 1 in another working state.

In the air conditioning system of some embodiments, the first air outlet 11A and the second air outlet 11B are arranged oppositely and are respectively located on two opposite sides of the shell 11, and the flow dividing portion 51 is movably arranged between the first air outlet 11A and the second air outlet 11B. This arrangement may reduce the distance between the flow dividing portion 51 and one of the first air outlet 11A and the second air outlet 11B, and may increase the distance between the flow dividing portion 51 and the other one of the first air outlet 11A and the second air outlet 11B, thereby facilitating rapid adjustment of the outlet air volume ratio.

In the air conditioning system of some embodiments, as shown in FIG. 2 to FIG. 6, the flow distribution device 5 further includes a driving portion. The driving portion 52 is in driving connection with the flow dividing portion 51, and is configured to change the relative position of the flow dividing portion 51 and at least one of the first air outlet 11A or the second air outlet 11B so as to change the outlet air volume ratio. The arrangement of the driving portion is beneficial to driving the flow dividing portion 51 to act to realize the required movement, thereby rapidly reaching the required outlet air volume ratio.

In the air conditioning system of some embodiments, as shown in FIG. 2 to FIG. 6, the driving portion 52 includes a switching mechanism 521, the flow dividing portion 51 includes a switching cooperation portion 514 cooperating with the switching mechanism 521, and the switching mechanism 521 is configured to move the switching cooperation portion 514 to drive the flow dividing portion 51 to move so as to change the relative position of the flow dividing portion 51 and at least one of the first air outlet 11A or the second air outlet 11B. The arrangement of the switching mechanism 521 facilitates the movement of the flow dividing portion 51, thereby rapidly adjusting the outlet air volume ratio.

In the air conditioning system of some embodiments, as shown in FIG. 2 to FIG. 6, the switching mechanism 521 includes a rotating shaft 5211 and a switching plate 5212. The rotating shaft 5211 is rotatably arranged on the shell 11. The switching plate 5212 is connected to the rotating shaft 5211 and cooperates with the switching cooperation portion 514. The switching mechanism 521 includes the rotating shaft 5211 and the switching plate 5212 so as to facilitate the movement of the flow dividing portion 51 by rotating the rotating shaft 5211, thereby rapidly adjusting the outlet air volume ratio.

In the air conditioning system of some embodiments, as shown in FIG. 2 to FIG. 6, the switching cooperation portion 514 includes an opening or groove formed in the flow dividing portion 51, and the switching mechanism 521 is inserted into the opening or groove. The switching cooperation portion 514 is arranged in the form of the opening or groove in the flow dividing portion 51. The switching cooperation portion 514 has a simple structure, is easy to process, and is beneficial to rapid assembling of the driving portion 52 and the flow dividing portion 51 and beneficial for the driving portion 52 to stably drive the flow dividing portion 51.

In the air conditioning system of some embodiments not shown in the figures, the driving portion 52 includes an actuator, and the actuator is in driving connection with the flow dividing portion 51 to drive the flow dividing portion 51 to move so as to change the relative position of the flow dividing portion 51 and at least one of the first air outlet 11A or the second air outlet 11B. The driving portion 52 includes the actuator, which is beneficial to automatically adjusting the outlet air volume ratio and reducing the manual participation process. However, in the air conditioning system of some embodiments, the actuator is not necessary, and the flow dividing portion may be driven to move by a manual driving mode instead of the actuator.

Figure 4:
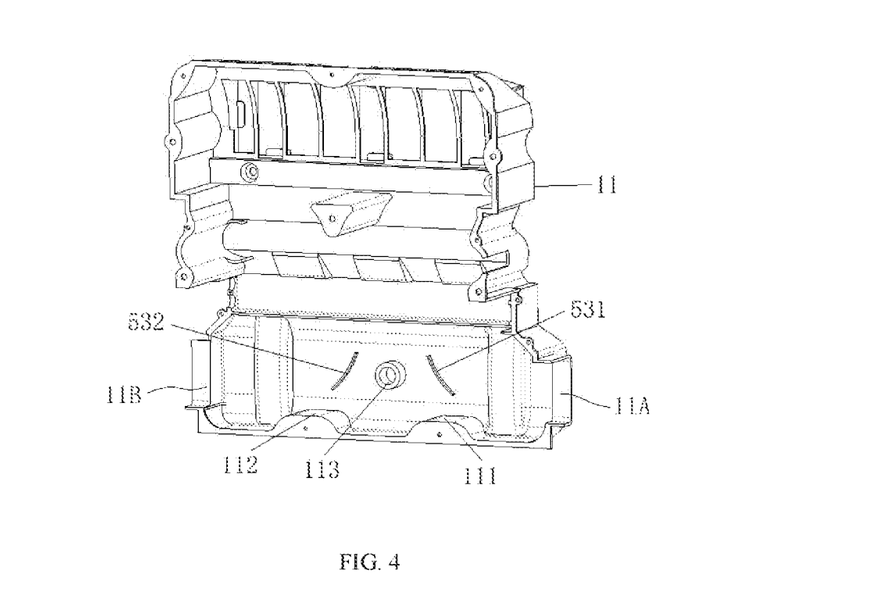
FIG. 4 is a structural schematic diagram of a combined structure of part of a shell of an air conditioner body and a limiting structure of a flow distribution device in the air conditioning system shown in FIG. 1.

In the air conditioning system of some embodiments, as shown in FIG. 2 to FIG. 4, the flow distribution device 5 further includes a limiting structure 53, and the limiting structure 53 is configured to limit the limit position of movement of the flow dividing portion 51. The arrangement of the limiting structure 53 is beneficial to avoiding over adjustment of the flow dividing portion 51 and to adjusting the outlet air volume ratio in a reasonable range.

In the air conditioning system of some embodiments, as shown in FIG. 2 to FIG. 4, the limiting structure 53 includes at least one of a first limiting portion 531 or a second limiting portion 532. The first limiting portion 531 is configured to limit the limit position of the flow dividing portion 51 moving towards the first air outlet 11A. The second limiting portion 532 is configured to limit the limit position of the flow dividing portion 51 moving towards the second air outlet 11B.

The limiting structure 53 is provided, and the limiting structure 53 includes at least one of the first limiting portion 531 or the second limiting portion 532, which are beneficial to avoiding over adjustment of the flow dividing portion 51 and to adjusting the outlet air volume ratio in a reasonable range.

In the air conditioning system of some embodiments, as show in FIG. 2 to FIG. 4, the limiting structure 53 includes a first protrusion arranged on an inner wall surface of the shell 11 and located between the flow dividing portion 51 and the first air outlet 11A, and/or a second protrusion arranged on an inner wall surface of the shell 11 and located between the flow dividing portion 51 and the second air outlet 11B. The limiting structure 53 is arranged in the form of the protrusion on the shell, and the limiting structure is simple and effective, and is beneficial to the stable adjustment range of the outlet air volume ratio.

Figure 7:
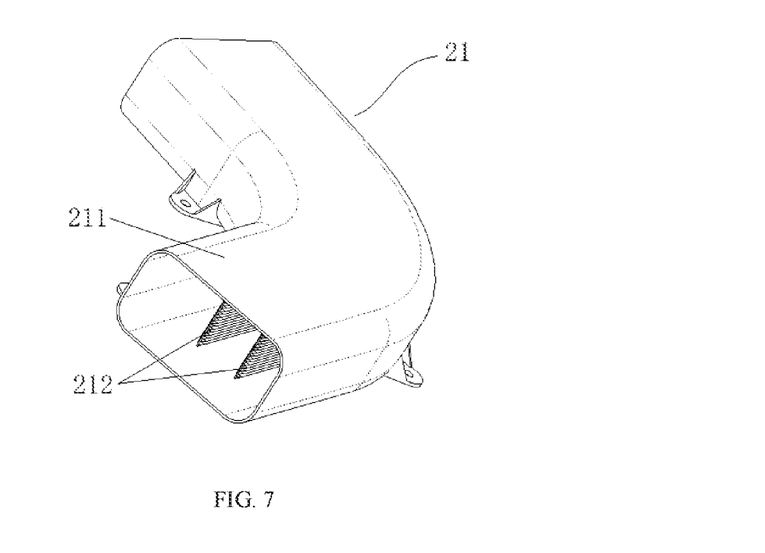
FIG. 7 is a structural schematic diagram of an elbow pipe of a second air supply pipeline in the air conditioning system shown in FIG. 1.
Figure 8:
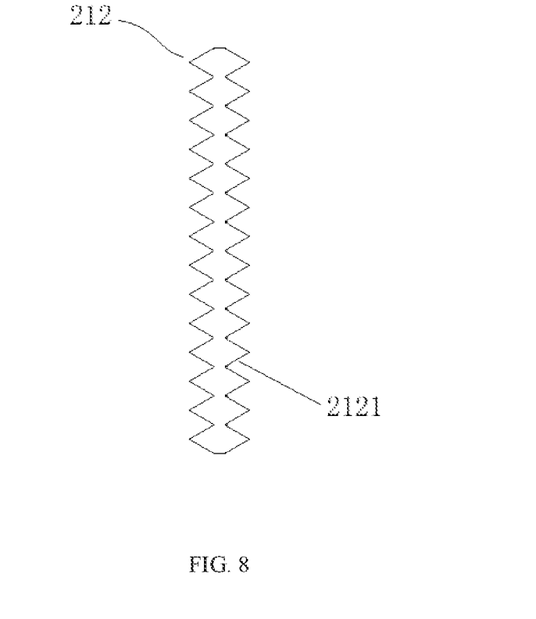
FIG. 8 is a section schematic diagram of a flow guide plate of the elbow pipe shown in FIG. 7.
Figure 9:
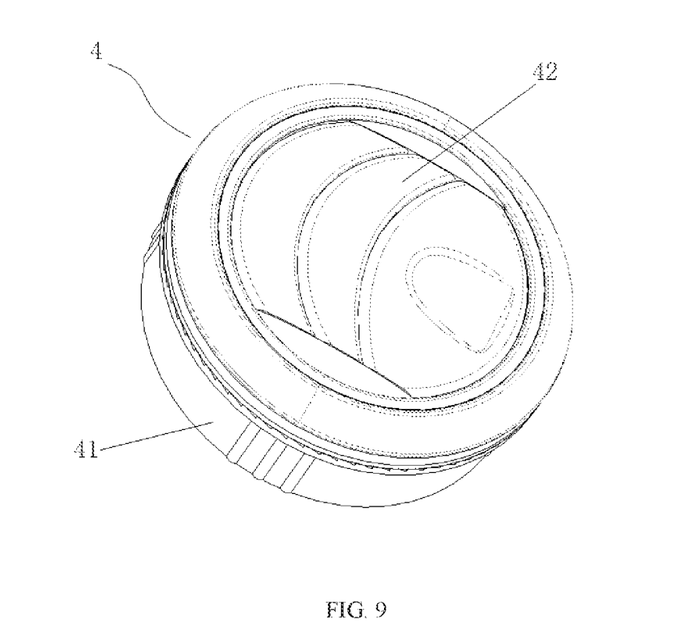
FIG. 9 is a structural schematic diagram of a circular first air supply port in one direction in the air conditioning system shown in FIG. 1.

In the air conditioning system of some embodiments, as shown in FIG. 7 and FIG. 8, the first air supply pipeline 2 or the second air supply pipeline 3 includes an elbow pipe 21. The elbow pipe 21 includes an elbow pipe body 211 and at least one flow guide plate 212. The elbow pipe body 211 is provided with an inner flow channel. The flow guide plate 212 is located in the elbow pipe body 211. At least one flow guide plate 212 divides the inner flow channel of the elbow pipe body 211 into a plurality of flow passing areas.

The flow guide plate 212 is arranged in the elbow pipe body 211, which is beneficial to uniform distribution of the air outlet volume of the plurality of air supply ports connected to the same air supply pipeline and is also beneficial to reducing large vortex flow at the elbow pipe 21, so that aerodynamic noise caused by the vortex flow is reduced.

As shown in FIG. 7 and FIG. 8, a surface of the flow guide plate 212 is provided with a plurality of flow guide grooves 2121 which extend along an extending direction of the elbow pipe body 211 and are arranged in parallel. The arrangement of the flow guide groove 2121 is beneficial to reducing large vortex flow at the elbow pipe 21, so that aerodynamic noise caused by the vortex flow is reduced.

The forms of the plurality of flow guide grooves 2121 may be varied. For example, in FIG. 8, the plurality of flow guide grooves 2121 are set as continuous triangular grooves. In the embodiment not shown in the figure, the plurality of flow guide grooves may also be spaced triangular grooves, continuous or spaced curved grooves, continuous or spaced square grooves, continuous or spaced trapezoidal grooves, continuous or spaced triangular or polygonal grooves with rounded transition, and the like.

In the air conditioning system of some embodiments, as shown in FIG. 9 to FIG. 12, at least one first air supply port 4 or at least one second air supply port 6 includes an air supply body 41 and at least one barrier strip 43. The air supply body 41 is provided with an air supply channel arranged along an air supply direction. At least one barrier strip 43 is arranged in the air supply channel and has an included angle with the air supply direction. A first toothed structure 431 is arranged on a windward side of the barrier strip 43 facing towards the air supply direction and/or a second toothed structure 432 is arranged on a leeward side of the barrier strip 43 back to the air supply direction.

The toothed structures of the first toothed structure 431 and the second toothed structure 432 may be the same or different. The forms of the first toothed structure 431 and the second toothed structure 432 may be varied. For example, the first toothed structure 431 and the second toothed structure 432 in FIG. 9 to FIG. 12 may be set as continuous triangular teeth. In the embodiments not shown in the figures, the first toothed structure 431 or the second toothed structure 432 may be set as spaced triangular teeth, continuous or spaced curved teeth, continuous or spaced square teeth, continuous or spaced trapezoidal teeth, continuous or spaced triangular or polygonal teeth with rounded transition, and the like.

In the air conditioning system of some embodiments, at least two barrier strips 43 of the plurality of barrier strips 43 are arranged in parallel and at intervals on a plane perpendicular to the air supply direction; and/or at least two barrier strips 43 of the plurality of barrier strips 43 are crossed on a plane perpendicular to the air supply direction.

The barrier strip 43 with the toothed structure is arranged in the air supply body 41 of the air supply port, and the plurality of barrier strips 43 are arranged reasonably, which are beneficial to reducing squealing noise prone to be generated at the corresponding air supply port in the cab.

In the engineering vehicle of some embodiments, the engineering vehicle is a loader-digger.

The engineering vehicle and the air conditioning system thereof provided by the embodiments of the present disclosure are further described by taking the loader-digger as an example and by combining with FIG. 1 to FIG. 12.

The loader-digger includes a cab, and an air conditioning system for adjusting the air of the cab.

As shown in FIG. 1 to FIG. 6, the air conditioning system mainly includes an air conditioner body 1, a first air supply pipeline 2, one or more first air supply ports 4, a second air supply pipeline 3, one or more second air supply ports 6 and a flow distribution device 5.

The air conditioner body 1 includes a shell 11 and a refrigerant circulating system (not shown in the figures) arranged in the shell 11. The refrigerant circulating system mainly includes a compressor, a condenser, an expanding valve and an evaporator which are connected through a refrigerant pipeline.

As shown in FIG. 1 to FIG. 4, the shell 11 is provided with a first air outlet 11A and a second air outlet 11B. The first air outlet 11A and the second air outlet 11B are arranged oppositely and are respectively located on two opposite sides of the shell 11.

As shown in FIG. 1, the shell 11 is further provided with a first air inlet and a second air inlet. The first air inlet and the second air inlet are both located at the top of the shell 11. The air conditioner body 1 further includes a first air inlet port 12 communicating with the first air inlet, and a second air inlet port 13 communicating with the second air inlet. The first air inlet port 12 is used to supply fresh air introduced from the outside of the cab to the shell 11. The second air inlet port 13 is used to supply circulating air in the cab to the shell 11.

A first end of the first air supply pipeline 2 is connected to the first air outlet 11A. The plurality of first air supply ports 4 are arranged at an inner front end of the cab, and each first air supply port 4 is connected to a second end of the first air supply pipeline 2.

The shapes of the plurality of first air supply ports 4 may be the same or different. In FIG. 1, the plurality of first air supply ports 4 include a circular air supply port and a square air supply port. The air entering the air conditioner body 1 from the first air inlet and/or the second air inlet respectively flows out of the first air outlet 11A and the second air outlet 11B after being treated (such as refrigerated) by the refrigerant circulating system. The air flowing out of the first air outlet 11A is conveyed to each first air supply port 4 through the first air supply pipeline 2 and is conveyed into the cab from the front end of the cab.

The first end of the second air supply pipeline 3 is connected to the second air outlet 11B. The plurality of second air supply ports 6 are arranged at an inner rear end of the cab, and each second air supply port 6 is connected to a second end of the second air supply pipeline 3.

The shapes of the plurality of second air supply ports 6 may be the same or different. For example, in FIG. 1, the plurality of second air supply ports 6 include a circular air supply port and a square air supply port. The air flowing out of the second air outlet 11B is conveyed to each second air supply port 6 through the second air supply pipeline 3 after being treated by the refrigerant circulating system, and is conveyed into the cab from the rear end of the cab.

The first air supply port is arranged at the inner front end of the cab, and the second air supply port is arranged at the rear end of the cab, so there are air supply ports in front of and behind the seat. When the working device of the loader-digger is at the loading end, the air supplied from the air supply ports at the front end and the rear end blow to the front side and the back side of the driver's body. When the working device of the loader-digger is at the digging end, the air supplied from the air supply ports at the front end and the rear end blow to the back side and the front side of the driver's body.

As shown in FIG. 2 to FIG. 6, the flow distribution device 5 includes a flow dividing portion 51 arranged in the shell 11, a driving portion 52 in driving connection with the flow dividing portion 51, and a limiting structure 53 for limiting the limit position of the movement of the flow dividing portion 51.

As shown in FIG. 2, FIG. 3 and FIG. 5, the flow dividing portion 51 is movably arranged between the first air outlet 11A and the second air outlet 11B. The flow dividing portion 51 is movably arranged relative to the first air outlet 11A and the second air outlet 11B so as to change an outlet air volume ratio of the air conditioner body 1.

As shown in FIG. 2, FIG. 3 and FIG. 5, the air treated by the refrigerant circulating system flows in the shell 11 from top to bottom. The flow dividing portion 51 includes a curved plate protruding upward overally and a planar bottom plate located below the curved plate. Two ends of the curved plate are fixedly connected to two ends of the bottom plate. A hollow portion is formed between the curved plate and the bottom plate. In order to improve the strength of the flow dividing portion 51, a plurality of reinforcing plates 515 are arranged in the hollow portion, and the reinforcing plates 515 may be connected to a part of the curved plate with a larger curvature or may also be connected between the curved plate and the bottom plate.

The flow dividing portion 51 includes a first wind shielding surface 511, a second wind shielding surface 512 and a wind guide surface 513 which are arranged on an outer surface of the curved plate. The first wind shielding surface 511 is arranged between the first air outlet 11A and the second air outlet 11B. The second wind shielding surface 512 is arranged between the first wind shielding surface 511 and the second air outlet 11B. The wind guide surface 513 protrudes towards the above (that is, the wind coming side).

The wind guide surface 513 is in smooth connection with the first wind shielding surface 511 and the second wind shielding surface 512 respectively.

The first wind shielding surface 511 inclines towards the first air outlet 11A from the wind guide surface 513, and the first wind shielding surface 511 facing towards the first air outlet 11A is a recessed curved surface.

The second wind shielding surface 512 inclines towards the second air outlet 11B from the wind guide surface 513, and the second wind shielding surface 512 facing towards the second air outlet 11B is a recessed curved surface.

The driving portion 52 is configured to change the relative position of the flow dividing portion 51 and the first air outlet 11A and the second air outlet 11B so as to change the outlet air volume ratio. The driving portion 52 includes a switching mechanism 521 and an actuator.

The flow dividing portion 51 includes a switching cooperation portion 514 cooperating with the switching mechanism 521. The switching mechanism 521 is configured to move the switching cooperation portion 514 so as to drive the flow dividing portion 51 to move.

Figure 6:
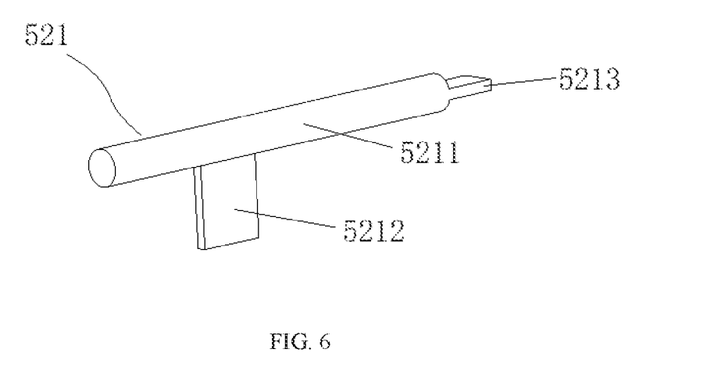
FIG. 6 is a structural schematic diagram of a switching mechanism of a flow distribution device of an air conditioner body in the air conditioning system shown in FIG. 1.

As shown in FIG. 2, FIG. 3 and FIG. 6, the switching mechanism 521 includes a rotating shaft 5211 and a switching plate 5212. The rotating shaft 5211 is rotatably arranged on the shell 11. As shown in FIG. 4, a sleeve 113 is arranged on an inner wall of the shell 11, and the rotating shaft 5211 extends into a center hole of the sleeve 113. The switching plate 5212 is connected below the rotating shaft 5211 and cooperates with the switching cooperation portion 514. The switching cooperation portion 514 includes an opening formed on the bottom plate of the flow dividing portion 51, and the opening is a rectangular hole. The switching mechanism 521 is arranged in the hollow portion of the flow dividing portion 51. The switching plate 5212 of the switching mechanism 521 is inserted into the rectangular hole.

The actuator is in driving connection with the flow dividing portion 51 through the switching mechanism 521 so as to drive the flow dividing portion 51 to move. In this embodiment, the actuator is a rotating motor which is in driving connection with the rotating shaft 5211. The rotating motor rotates to drive the rotating shaft 5211 to rotate, the rotating shaft 5211 rotates to drive the switching plate 5212 to swing, the switching plate 5212 swings to drive the flow dividing portion 51 to move towards the first air outlet 11A or move towards the second air outlet 11B, so that the flow passing area of a channel (arranged on the left sides in FIG. 2 and FIG. 3) which is formed by the first wind shielding surface 511 of the flow dividing portion 51 and the shell 11 in an enclosing way and communicates with the first air outlet 11A and the flow passing area of a channel (arranged on the right sides in FIG. 2 and FIG. 3) which is formed by the second wind shielding surface 512 and the shell 11 in an enclosing way and communicates with the second air outlet 11B can be changed, and the outlet air volume ratio can be changed.

As shown in FIG. 2 to FIG. 4, the limiting structure 53 includes a first limiting portion 531 and a second limiting portion 532. The first limiting portion 531 limits the limit position of the flow dividing portion 51 moving towards the first air outlet 11A. The second limiting portion 532 limits the limit position of the flow dividing portion 51 moving towards the second air outlet 11B. The first limiting portion 531 of the limiting structure 53 includes a first protrusion which is arranged on an inner wall surface of the shell 11 and is located between the flow dividing portion 51 and the first air outlet 11A. The second limiting portion 532 of the limiting structure 53 includes a second protrusion which is arranged on an inner wall surface of the shell 11 and is located between the flow dividing portion 51 and the second air outlet 11B.

The first protrusion of the first limiting portion 531 is set as a strip-shaped protrusion which is consistent with the section shape of the first wind shielding surface 511. The second protrusion of the second limiting portion 532 is set as a strip-shaped protrusion which is consistent with the section shape of the second wind shielding surface 512. This arrangement is beneficial to improving the position certainty every time the flow dividing portion 51 arrives at the limit position, thereby contributing to the range stability of the outlet air volume ratio.

In order to facilitate the positioning and movement of the flow dividing portion 51, a supporting base for placing the flow dividing portion 51 is arranged at the bottom of the inner wall of the shell 11. As shown in FIG. 2 to FIG. 4, two supporting bases may be arranged between the first air outlet 11A and the second air outlet 11B at intervals, and the two supporting bases are respectively a first supporting base 111 and a second supporting base 112.

As shown in FIG. 1, the first air supply pipeline 2 includes an elbow pipe 21. As shown in FIG. 7, the elbow pipe 21 includes an elbow pipe body 211 and two flow guide plates 212. The elbow pipe body 211 includes an inner flow channel. The flow guide plate 212 is located in the elbow pipe body 211. As shown in FIG. 7 and FIG. 8, a surface of the flow guide plate 212 includes a plurality of flow guide grooves 2121 which extend along an extending direction of the elbow pipe body 211 and are arranged in parallel. The two flow guide plates 212 divide the inner flow channel of the elbow pipe body 211 into three flow passing areas.

As shown in FIG. 7 and FIG. 8, the section of the flow guide plate 212 perpendicular to the flowing direction of the elbow pipe body 211 includes a plurality of continuous triangular grooves. That is, the section shape of the flow guide groove 2121 is triangular, and the adjacent flow guide grooves 2121 are arranged without intervals.

In this embodiment, each first air supply port 4 and each second air supply port 6 include an air supply body 41 and at least one barrier strip 43. The following performs description by taking the circular first air supply port 4 shown in FIG. 9 and FIG. 10 and the square first air supply port 4 shown in FIG. 11 to FIG. 12 as an example. The structure of the second air supply port 6 may be referenced to the first air supply port 4.

As shown in FIG. 9 to FIG. 12, the first air supply port 4 includes an air supply body 41, an air volume adjusting plate 42 and a barrier strip 43. The air supply body 41 includes an air supply channel arranged along an air supply direction. The air volume adjusting plate 42 is arranged at the downstream of the barrier strip 43 along an air supply direction. The barrier strip 43 is arranged in the air supply channel and has an included angle with the air supply direction. A first toothed structure 431 is arranged on a windward side of the barrier strip 43 facing towards the air supply direction. A second toothed structure 432 is arranged on a leeward side of the barrier strip 43 back to the air supply direction.

As shown FIG. 9 to FIG. 12, the first toothed structure 431 and the second toothed structure 432 are arranged uniformly along a length direction of the barrier strip 432. The first toothed structure 431 and the second toothed structure 432 on the section perpendicular to the length direction of the barrier strip 432 are provided with a plurality of continuous triangular teeth.

Figure 10:
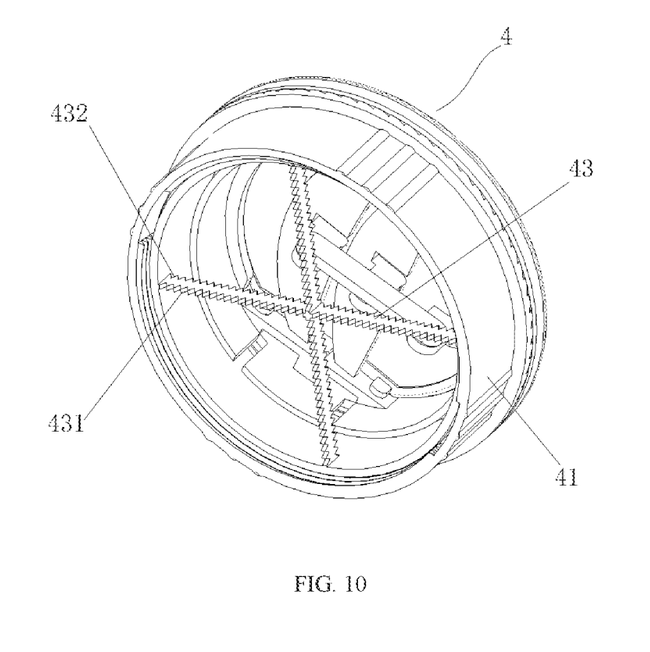
FIG. 10 is a structural schematic diagram of the first air supply port shown in FIG. 9 in another direction.
Figure 11:
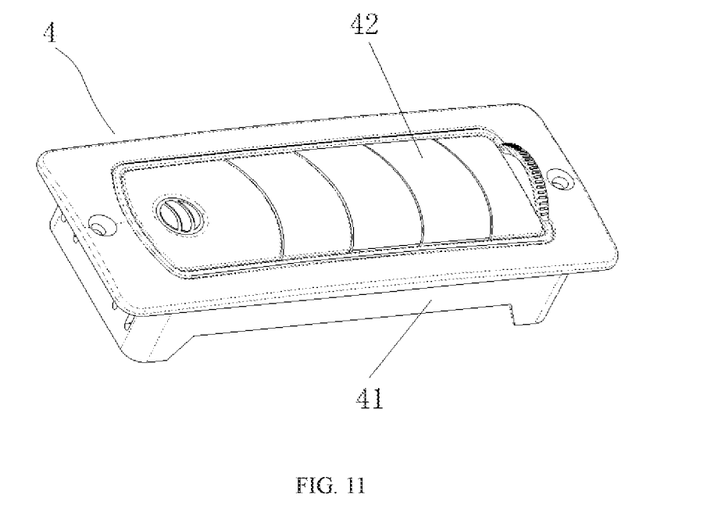
FIG. 11 is a structural schematic diagram of a square first air supply port in one direction in the air conditioning system shown in FIG. 1.

As shown in FIG. 10, two barrier strips 43 are perpendicularly crossed on a plane perpendicular to the air supply direction.

Figure 12:
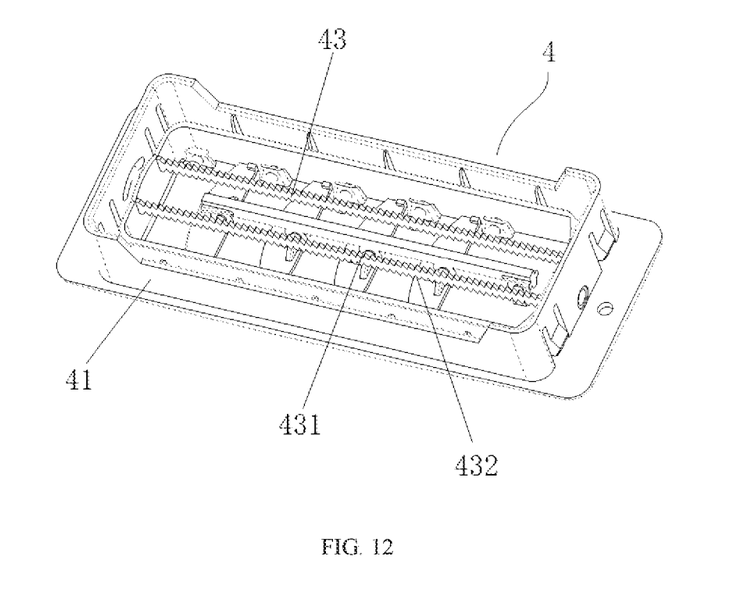
FIG. 12 is a structural schematic diagram of the first air supply port shown in FIG. 11 in another direction.

As shown in FIG. 12, two barrier strips 43 are arranged in parallel and at intervals on a plane perpendicular to the air supply direction.

During work of the loader-digger, while working device is switched between the loading end device and the digging end device, the actuator rotates the rotating shaft 5211 to drive the switching plate 5212 to swing, and the switching plate 5212 pushes the hole wall of the rectangular hole of the flow dividing portion 51 serving as the switching cooperation portion 514 while swinging, so that the flow dividing portion 51 moves under the supporting of the first supporting base 111 and the second supporting base 112, the flow passing area of the channel leading to the first air outlet 11A and the second air outlet 11B is changed, the air volume of the first air supply pipeline 2 supplied to the loading end and the air volume of the second air supply pipeline 3 supplied to the digging end are changed, the outlet air volume ratio is adjusted, the direction which the driver faces obtains more air volume, and the comfortability of the driver is improved.

The first limiting portion 531 and the second limiting portion 532 of the limiting structure 53 determine the limit position of movement of the flow dividing portion 51. When the loading end device works, the flow dividing portion 51 and the switching mechanism 521 of the flow distribution device 5 are arranged at the position shown in FIG. 2, and the second wind shielding surface 512 of the flow dividing portion 51 abuts to the second limiting structure 532. The channel leading to the first air outlet 11A for supplying air to the loading end is wider than the channel leading to the second air outlet 11B for supplying air to the digging end, the air volume supplied to the loading end is greater than the air volume supplied to the digging end, and the air volume blowing to the front side of the driver is greater than the air volume blowing to the back side of the driver. The direction of the arrow in FIG. 2 represents the air supply direction, and the thickness of the arrow represents the air volume.

On the contrary, when the digging end device works, the flow dividing portion 51 and the switching mechanism 521 of the flow distribution device 5 are arranged at the position shown in FIG. 3, and the first wind shielding surface 511 of the flow dividing portion 51 abuts to the first limiting structure 531. The channel leading to the first air outlet 11A for supplying air to the loading end is narrower than the channel leading to the second air outlet 11B for supplying air to the digging end, the air volume supplied to the digging end is greater than the air volume supplied to the loading end, and the air volume blowing to the front side of the driver is greater than the air volume blowing to the back side of the driver. The direction of the arrow in FIG. 3 represents the air supply direction, and the thickness of the arrow represents the air volume.

A flow guide plate 212 extending along the flowing direction of the inner flow channel is arranged at the inner flow channel of the elbow pipe body 211 of the elbow pipe 21 in the second air supply pipeline 3, the radian of the flow guide plate 212 is consistent with the radian of the elbow pipe body 211, the flow velocity of the air in the inner flow channel of the elbow pipe body 211 is uniform, and it is beneficial to reduce the air volume difference between the radial inner side and outer side of the elbow pipe body 211, thereby facilitating uniform distribution of the air volume of each air supply port supplied air to the same end of the cab.

The arrangement of the flow guide plate 212 is beneficial to reducing the vortex flow and reducing the noise of the vortex flow.

A plurality of flow guide grooves 2121 are arranged on two sides of the flow guide plate 212, which can comb the vortex flow at the elbow pipe 21 and is beneficial to reducing the noise of the vortex flow.

The barrier strip 43 forming an included angle with the air supply direction is arranged in the air supply channel of the air supply port, and the barrier strip 43 includes the toothed structure. Further, in order to match with the shape of the air supply body 41 of the air supply port, the barrier strips 43 of the circular air supply ports are designed into crossed arrangement, and the barrier strips 43 of the rectangular air supply ports are arranged into parallel arrangement. When each air supply port supplies air to the cab, the toothed structure on the barrier strip 43 acts as a vortex generator during air supply, the large-scale vortex is converted into several small vortex flow, and the contribution of the discrete vortex to the space-induced velocity field is much smaller than that of single concentrated vortex flow, so that the toothed structure can play a role in silencing and reducing noise, and it is beneficial to reduce the squealing noise at the air supply port.

Finally, it should be noted that the above embodiments are only used to describe the technical solution of the present disclosure, but not to limit thereto. Although the present disclosure is described in detail with reference to preferred embodiments, those of ordinary skill in the art should understand: the specific embodiments of the present disclosure still can be modified or part of technical features can be equivalently substituted, which should be included in the scope of the technical solutions claimed by the present disclosure.

The invention claimed is:

1. An engineering vehicle, comprising:
   a cab, comprising a seat, configured to switch between facing forward so that a driver faces forward and facing backward so that the driver faces backward; and
   an air conditioning system for adjusting the temperature of the cab;
   wherein the air conditioning system comprises:
   an air conditioner body, comprising a shell, wherein the shell comprises a first air outlet and a second air outlet;
   a first air supply pipeline, a first end of the first air supply pipeline being connected to the first air outlet;
   one or more first air supply ports, arranged at an inner front end of the cab and connected to a second end of the first air supply pipeline;
   a second air supply pipeline, a first end of the second air supply pipeline being connected to the second air outlet;
   one or more second air supply ports, arranged at an inner rear end of the cab and connected to a second end of the second air supply pipeline; and
   a flow distribution device, comprising a flow dividing portion arranged in the shell, wherein the flow dividing portion is movably arranged relative to at least one of the first air outlet or the second air outlet so as to change an outlet air volume ratio of the air conditioner body, and the outlet air volume ratio is a ratio of an air volume flowing out of the shell from the first air outlet to an air volume flowing out of the shell from the second air outlet,
   wherein the first air supply ports and the second air supply ports are configured such that: when the seat is facing forward, the air supplied from the first air supply ports and the second air supply ports blows to the front side and back side of the driver's body respectively, and when the seat is facing backwards, the air supplied from the first air supply ports and the second air supply ports blows towards the back side and front side of the driver's body respectively; and
   wherein the flow dividing portion comprises:
   a first wind shielding surface, arranged between the first air outlet and the second air outlet;
   a second wind shielding surface, arranged between the first wind shielding surface and the second air outlet; and
   a wind guide surface, protruding towards a wind coming side, the wind guide surface being in smooth connection with the first wind shielding surface and the second wind shielding surface respectively.

2. The engineering vehicle according to claim 1, wherein the first wind shielding surface inclines towards the first air outlet from the wind guide surface; or
   the second wind shielding surface inclines towards the second air outlet from the wind guide surface; or
   the first wind shielding surface inclines towards the first air outlet from the wind guide surface, and the second wind shielding surface inclines towards the second air outlet from the wind guide surface.

3. The engineering vehicle according to claim 2, wherein one side of the first wind shielding surface facing towards the first air outlet is a recessed curved surface; or
   one side of the second wind shielding surface facing towards the second air outlet is a recessed curved surface; or
   one side of the first wind shielding surface facing towards the first air outlet is a recessed curved surface, and one side of the second wind shielding surface facing towards the second air outlet is a recessed curved surface.

4. The engineering vehicle according to claim 1, wherein the first air outlet and the second air outlet are arranged oppositely and are respectively located on two opposite sides of the shell, and the flow dividing portion is movably arranged between the first air outlet and the second air outlet.

5. The engineering vehicle according to claim 1, wherein the flow distribution device further comprises a driving portion, and the driving portion is in driving connection with the flow dividing portion and is configured to change the relative position of the flow dividing portion and at least one of the first air outlet or the second air outlet so as to change the outlet air volume ratio.

6. The engineering vehicle according to claim 5, wherein the driving portion comprises a switching mechanism, the flow dividing portion comprises a switching cooperation portion cooperating with the switching mechanism, and the switching mechanism is configured to move the switching cooperation portion to drive the flow dividing portion to move so as to change the relative position of the flow dividing portion and at least one of the first air outlet or the second air outlet.

7. The engineering vehicle according to claim 6, wherein the switching mechanism comprises:
   a rotating shaft, rotatably arranged on the shell; and
   a switching plate, connected to the rotating shaft and configured to cooperate with the switching cooperation portion.

8. The engineering vehicle according to claim 6, wherein the switching cooperation portion comprises an opening or groove formed in the flow dividing portion, and the switching mechanism is inserted into the opening or groove.

9. The engineering vehicle according to claim 5, wherein the driving portion comprises an actuator, the actuator is in driving connection with the flow dividing portion to drive the flow dividing portion to move so as to change the relative position of the flow dividing portion and at least one of the first air outlet or the second air outlet.

10. The engineering vehicle according to claim 1, wherein the flow distribution device further comprises a limiting structure, and the limiting structure is configured to limit the limit position of movement of the flow dividing portion.

11. The engineering vehicle according to claim 10, wherein the limiting structure comprises:
- a first limiting portion, configured to limit the limit position of the flow dividing portion moving towards the first air outlet; or
- a second limiting portion, configured to limit the limit position of the flow dividing portion moving towards the second air outlet; or
- a first limiting portion, configured to limit the limit position of the flow dividing portion moving towards the first air outlet, and a second limiting portion, configured to limit the limit position of the flow dividing portion moving towards the second air outlet.

12. The engineering vehicle according to claim 10, wherein the limiting structure comprises a first protrusion arranged on an inner wall surface of the shell and located between the flow dividing portion and the first air outlet, and/or a second protrusion arranged on an inner wall surface of the shell and located between the flow dividing portion and the second air outlet.

13. The engineering vehicle according to claim 1, wherein the first air supply pipeline or the second air supply pipeline comprises an elbow pipe, and the elbow pipe comprises:
- an elbow pipe body, having an inner flow channel, and
- at least one flow guide plate, the flow guide plate being located in the elbow pipe body, and the at least one flow guide plate dividing the inner flow channel of the elbow pipe body into a plurality of flow passing areas.

14. The engineering vehicle according to claim 13, wherein a surface of the flow guide plate comprises a plurality of flow guide grooves which extend along an extending direction of the elbow pipe body and are arranged in parallel.

15. The engineering vehicle according to claim 1, wherein at least one of the first air supply ports or at least one of the second air supply ports comprise:
- an air supply body, having an air supply channel arranged along an air supply direction; and
- one or more barrier strips, the barrier strip being arranged in the air supply channel and forming an included angle with the air supply direction, and a first toothed structure being arranged on a windward side of the barrier strip facing towards the air supply direction and/or a second toothed structure being arranged on a leeward side of the barrier strip back to the air supply direction.

16. The engineering vehicle according to claim 15, wherein
- at least two barrier strips of the plurality of barrier strips are arranged on a plane perpendicular to the air supply direction in parallel and at intervals; or
- at least two barrier strips of the plurality of barrier strips are crossed on a plane perpendicular to the air supply direction; or
- at least two barrier strips of the plurality of barrier strips are arranged on a plane perpendicular to the air supply direction in parallel and at intervals, and at least two barrier strips of the plurality of barrier strips are crossed on a plane perpendicular to the air supply direction.

17. The engineering vehicle according to claim 1, wherein the engineering vehicle is a loader-digger.

* * * * *